Oct. 11, 1938.  D. J. BAKER  2,133,241
DISTANCE FINDER
Original Filed Sept. 14, 1935   3 Sheets-Sheet 1
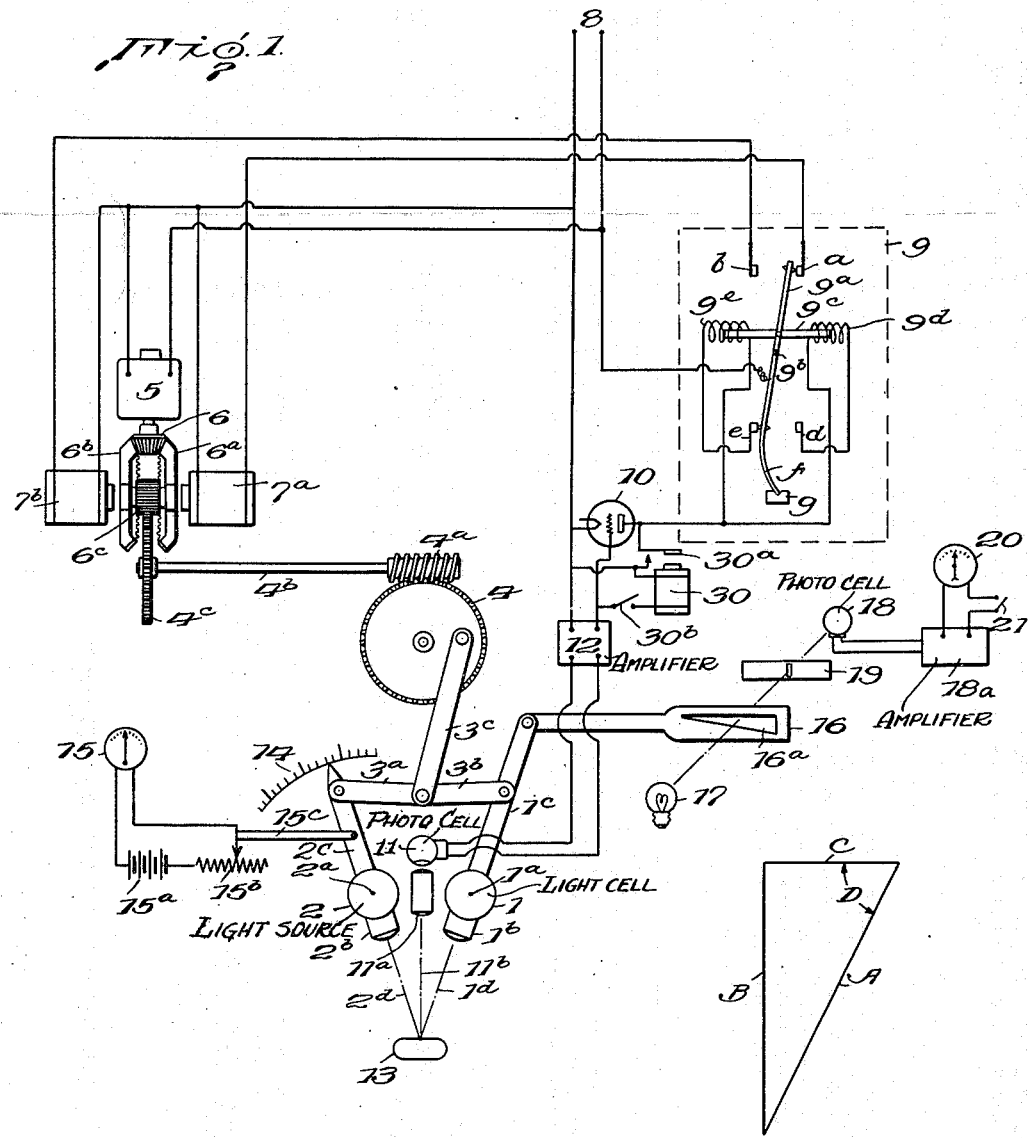
Inventor
Donald J. Baker,
By Ralph B. Stewart
Attorney Oct. 11, 1938.  D. J. BAKER  2,133,241
DISTANCE FINDER
Original Filed Sept. 14, 1935  3 Sheets-Sheet 2

Inventor
Donald J. Baker,
By Ralph B. Stewart
Attorney

Oct. 11, 1938.    D. J. BAKER    2,133,241
DISTANCE FINDER
Original Filed Sept. 14, 1935    3 Sheets-Sheet 3
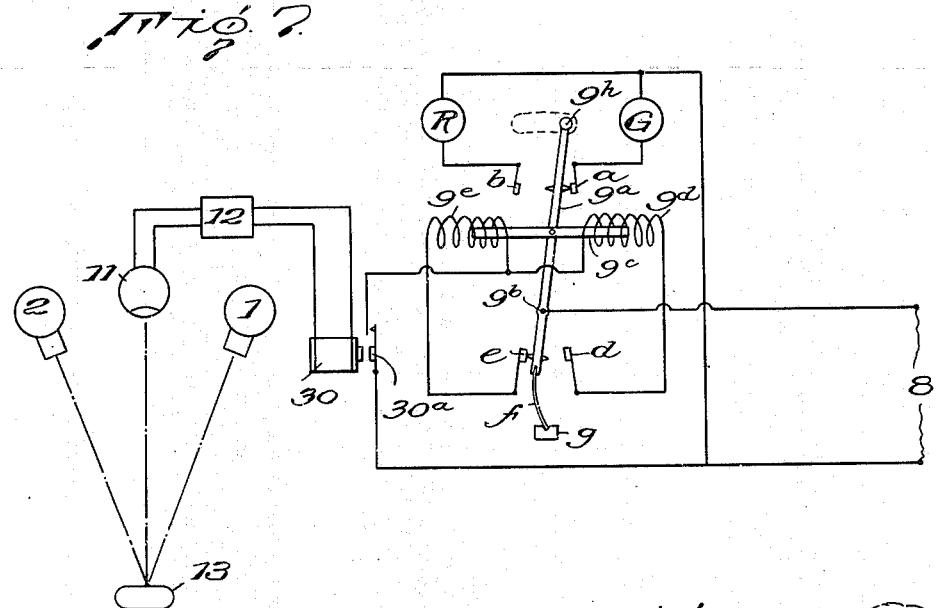
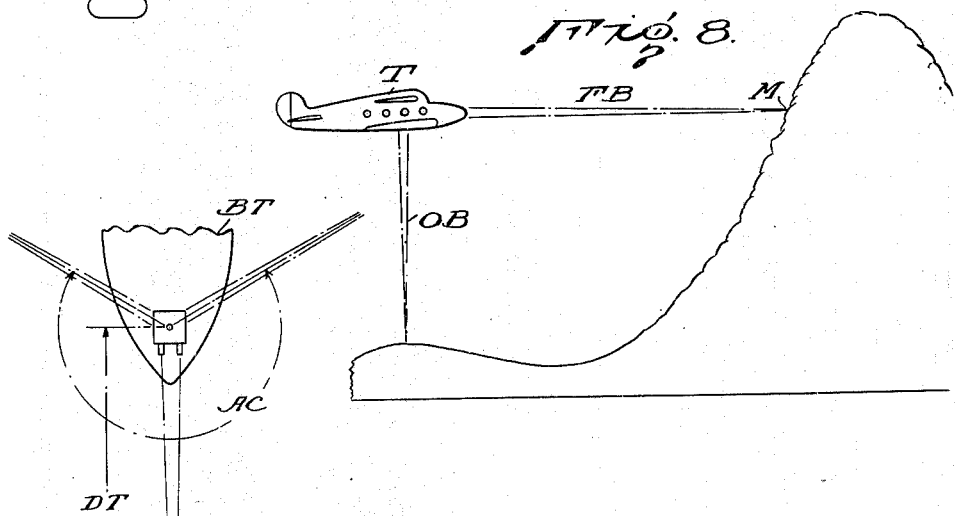
Inventor
Donald J. Baker,
By Ralph O. Stewart
Attorney Patented Oct. 11, 1938

2,133,241

UNITED STATES PATENT OFFICE 2,133,241

DISTANCE FINDER

Donald J. Baker, Pasadena, Calif., assignor of one-half to Loretta C. Baker, Pasadena, Calif., and one-half to Ben C. Brindley, Los Angeles, Calif.

Application September 14, 1935, Serial No. 40,653
Renewed August 9, 1938

12 Claims. (Cl. 177—352)

My invention relates to distance finders and in particular to an arrangement for automatically determining the distance of an object from a point of observation.

My invention is especially suitable for use on aircraft as an altimeter, or for indicating the presence of an object within the range of the apparatus. It is also useful in times of war either on board ship or on land for detecting the presence of enemy ships or planes. Other uses will be obvious to those skilled in the art.

An object of my invention is to devise apparatus for determining the distance of an object from a point of observation and in which a beam of light (or other form of radiant energy) is projected from a point located a known distance from the point of observation and is reflected from the object back to the point of observation, and the distance of the object is automatically determined by the apparatus according to the principles of triangulation.

A further object of my invention is to devise a distance determining apparatus which will automatically follow the moving object and produce an indication of the distance of the object at any instant.

Still another object of my invention is to provide distance determining apparatus which continuously searches for an object along a given line of observation and will automatically cease the searching or hunting operation as soon as an object moves into position in the line of observation.

In the embodiments of my invention described and illustrated herein, light waves are employed to form the beams of radiant energy, but other forms of radiant energy may be used, such as radio waves or infra-red rays, and it will be understood that the term "light" as used herein signifies any suitable form of radiant energy.

In accomplishing the objects of my invention I provide an apparatus having a light sensitive element for receiving light along a given line of observation, and at a point located a known distance from the line of observation, I provide means for projecting a concentrated beam of light to intersect the line of observation, suitable apparatus being provided for automatically and periodically varying the angle of the projected beam with respect to the line of observation so the projected beam intersects the line of observation at varying distances from the point of observation, the light sensitive element being arranged to stop the automatic angular movement of the light beam projecting apparatus upon the receipt of light waves reflected from an object located in the line of observation.

In one form of my invention the light beam remains set with respect to the line of observation, and the light sensitive element operates to energize an alarm signal to indicate the presence of an object within a given distance from the point of observation.

My invention is illustrated in the accompanying drawings in which:

Figure 1 is a schematic diagram illustrating the general arrangement of one embodiment of my invention;

Figure 2 is a diagram for explaining the principle of my invention;

Figure 7 is a schematic diagram illustrating a form of my invention arranged to give an alarm when objects appear in the line of observation within a fixed distance of the point of observation.

Figure 8 illustrates the manner in which the arrangements of Figures 1 and 7 are employed on an airplane; and Figure 9 illustrates the apparatus of Figure 7 in use on shipboard.

Figure 3:
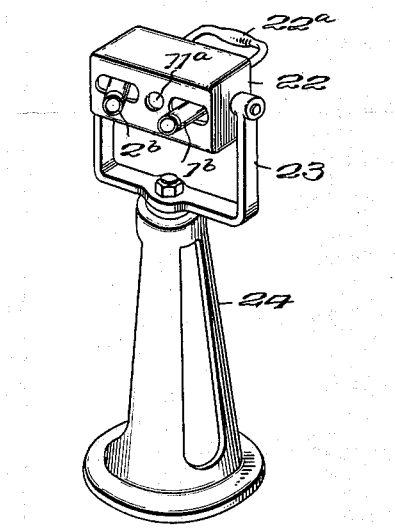
Figure 3 is a perspective view showing the manner in which the distance finder is mounted for universal movement.

Referring to Figure 1, I and 2 represent two spaced housings mounted for pivotal movement about the axes 1a and 2a, respectively, and containing powerful sources of light. These housings are provided with appropriate lens tubes 1b and 2b for projecting concentrated beams of light along the axes of the lens tubes. The housings I and 2 are rotated about their axes by means of levers 1c and 2c, which levers are joined by a pair of pivotally connected arms 3a and 3b forming a toggle connection between the operating levers 1c and 2c. An arm 3c is pivotally connected with the arms 3a and 3b midway between the arms 1c and 2c, and is pivotally connected with an eccentric pin on gear wheel 4 which is driven by a worm 4a on shaft 4b. The arrangement is such that when gear 4 rotates continuously, the links 3a, 3b and 3c operate to swing the light housings I and 2 about their pivotal axes so as to vary the angle between the projected light beams from a position where they are substantially parallel to a position where they intersect each other at a short distance from the housings. The shaft 4b is driven from a continuously operating motor 5 through a reversible clutch arrangement comprising a pinion gear 6 driven by the motor 5 and arranged to drive two bevel gears 6a and 6b in opposite directions; a shiftable pinion gear 6c mounted between the gears 6a and 6b and provided with clutch elements on each end thereof adapted to cooperate with gears 6a and 6b; and magnets 7a and 7b arranged to shift the pinion 6c axially to engage either the gear 6a or the gear 6b and thereby reverse the direction of rotation of the pinion. The pinion gear 6c drives a gear 4c mounted upon shaft 4b. The details of the reversible clutch arrangement for driving the shaft 4b are more fully disclosed and claimed in a copending application Serial No. 24,410 filed May 31, 1935.

The motor 5 is continuously energized from a current supply circuit 8, and energization of the magnet 7a and 7b is controlled by the automatic switch represented in the dotted rectangle 9 and by tube relay 10 which in turn is controlled by a light sensitive cell 11 operating through an amplifier 12. The switch 9 is formed of an arm 9a pivoted at 9b, and the upper end of the arm engages contacts a and b to supply currents to magnets 7a and 7b, respectively, from the circuit 8. The switch arm is operated by means of a core 9c provided with operating windings 9d and 9e arranged at opposite ends of the core, and energization of the coils 9d and 9e is controlled by contacts d and e cooperating with the lower end of arm 9a. The circuits for the coils 9d and 9e are completed from the supply circuit 8 through the relay 10 which, in the example shown, comprises a relay of the "Thyratron" type having the well known characteristic that current may be prevented from flowing in the plate circuit of the tube by the application of a suitable biasing potential to the grid, but once current is established in the plate circuit the grid cannot exert any control over the current until the current is reduced to zero. The lower end of the arm 9a is provided with a spring extension f engaging a fixed abutment g, and this extension serves to make the arm unstable in the neutral position and operates to maintain the arm 9a in the position to which it was last operated. Contacts a, b, d and e are preferably mounted upon suitable spring supports so they will follow the arm a short distance before breaking contact.

The light sensitive cell 11 is arranged to receive light from a lens tube 11a located midway between the light sources 1 and 2 and is designed to receive light from only one direction, that is, along the line of observation at right angles to the line passing through the pivotal axes of sources 1 and 2. The amplifier 12 normally impresses a biasing potential of proper polarity and magnitude upon the grid of relay 10 to prevent establishment of current in the tube, but upon energization of the light cell 11, the amplifier operates to change the biasing potential either in magnitude or polarity to permit current to be established in the relay 10. Suitable amplifier circuits for this purpose are well known and will not be described here.

It will be understood that the beams of light projected by the sources 1 and 2 are concentrated beams, and the lens tube 11a receives light from only one direction, that is, along the line of observation which bisects the angle between the two beams projected from the sources 1 and 2. The light beams are indicated by the lines 1d and 2d, respectively, and the ray of light which will affect the cell 11 (or the line of observation) is indicated by the line 11b.

Operation of the arrangement shown in Figure 1 is as follows: With the circuit in the condition shown in the drawings, magnet 7a is energized through the switch 9, and the motor 5 drives the gear 4 continuously in one direction, thereby causing the continuous oscillation of the light sources 1 and 2 about their pivotal axes. So long as no object comes within the path of the light beams at a point where they cross the line of observation, the circuit arrangement will remain as shown in the drawings and the motor 5 will continue to oscillate the light sources about their pivotal axes. Assume now that an object 13 moves into the position shown in the drawings (or the apparatus is oriented so the object 13 is in the line of observation) so as to intercept the light beams 1d and 2d, light reflected from the object at 13 will pass through the lens tube 11a and energize the light cell 11 which in turn will cause the energization of relay 10 through the amplifier 12. Since the beams from the light sources 1 and 2 are moving across the line of observation, the cell 11 will receive only a momentary light pulse, but this momentary pulse will be sufficient to energize the relay 10. Upon the establishment of current through relay 10, magnet 9e of switch 9 will be energized from circuit 8 and the switch arm 9a will be moved into the opposite position, thereby de-energizing magnet 7a of the clutch and energizing magnet 7b. When the armature 9a moves from contact a to contact b, the plate circuit of the relay 10 will be interrupted at contact e, and the switch 9 will remain in its last operated position until the relay 10 is again energized. Energization of magnet 7b reverses the direction of rotation of gear 4 and causes the light beams to sweep back across the line of observation, which again results in energization of cell 11, relay 10, and operation of switch 9 to reverse the rotation of gear 4. This reversing operation continues so long as the object remains in the line of observation, but the amount of oscillation of the light sources 1 and 2 necessary to effect reversal of the gear 4 is very small, and the light sources assume a mean position as is indicated in the drawings. Since the light sources 1 and 2 are separated by equal fixed distances from the line of observation, and only the angle between the beam 1d or 2d and the line of observation 11b changes, the distance from the point of observation to the object can be readily determined as a function of the angle between one beam and the line of observation. If desired, a suitable scale 14 graduated in units of linear measure may be associated with one of the operating arms of the light sources to indicate directly the distance of the object for any given angular position of the light sources. It will be seen that the angular movement of the two light beams from the sources 1 and 2 is symmetrical with respect to the line of sight of the lens tube 11a, and the apparatus will operate satisfactorily with only one source of light.

In Figure 2 I have shown a diagram for illustrating the principle of my distance finder. In this diagram the line A represents the direction of the transmitted light beam 1a, and the length of this line represents the distance between the light source 1 and the object 13. The line B represents in direction and distance the ray of light reflected from the object 13 back to the lens tube 11a along the line of observation, and the line C arranged at right angles to the line B represents the distance between the line of observation and the center of rotation of the light source 1. In any given apparatus, the length of line C is fixed and the angle D between the line C and A is observable. The line B, representing the distance between the point of observation and the object 13 is to be determined. The trigonometric relations represented in Figure 2 are $$\frac{B}{C} = \tan. D,$$

or $B = C \tan. D$. It will thus be seen that the length of line B varies as the tangent of the angle D, and the scale 14 may be suitably graduated to indicate the distance directly for any given angular position of the arm 2c.

An alternative method of indicating the distance may be provided by arranging an electric meter or indicating instrument 15 in circuit with a battery 15a and a variable resistance 15b, the resistance being varied in value by a connection 15c between the variable contact on the resistance and the operating arm 2c. This method of indication may be used to provide a distance indication at a point remote from the distance finder apparatus.

Another method of indicating the distance observations may involve a light screen 16 connected to operating lever 1c to be moved in accordance with the changes in angular position of the light source 1 and provided with an aperture 16a of suitable contour and arranged in the path of a light beam extending from a source of light 17 to a light sensitive cell 18. A stationary light screen 19 is also inserted between the source 17 and the cell 18 and is provided with a vertical slit aperture to permit a narrow beam of light to fall upon the cell 18, and the width of this beam is regulated by variations in the width of the aperture 16a. The cell 18 is connected through a suitable amplifier 18a to an electric meter 20 which is graduated to indicate the distance corresponding to any given angular position of the light source 1. A switch 21 is provided for controlling the circuit to the meter 20.

By proper design of the contour of aperture 16a, the meter 20 may be calibrated directly in feet or other units of length. It will be understood that the elements 16, 17, 18 and 19 are arranged in a suitable light-tight casing, not shown. This arrangement may be termed "a light protractor" and is capable of general use.

In the operation of my distance finder, should the object 13 move out of the line of observation, the switch 9 will remain in the position to which it was last operated, and the gear 4 will be operated continuously in one direction and will continue to so operate until light is again reflected from an object in the line of observation on to the cell 11.

In case the object 13 should move along the line of observation, the automatic operation of my distance finder will cause the light sources 1 and 2 to adjust themselves in position to follow the object along the line of observation and to give a continuous indication of the distance of the object from the point of observation.

In order to be able to follow an object moving across the line of observation, or to establish a new line of observation, the essential parts of the apparatus shown in Figure 1 are mounted upon a common base or support, which in turn is suitably mounted for universal movement. A suitable arrangement for this purpose is illustrated in Figure 3 in which the distance finding apparatus is enclosed within a common housing or support 22 pivotally supported on a horizontal axis in a frame 23, which in turn is supported for rotation on a vertical axis upon a standard or pedestal 24. The housing 22 encloses the light sources 1 and 2, and the lens tubes 1b and 2b associated with these sources may be arranged to extend outside of the housing through suitable openings as shown in the drawings. Housing 22 also contains the lens tube 11a and all apparatus necessary for the automatic operation of the distance finder. The housing 22 is preferably so mounted that the horizontal pivotal axis on the frame 23 passes through or near the center of gravity of the housing and its contents, and the vertical axis of rotation passes through the line of observation. A handle 22a is provided at the back of housing 22 for the purpose of shifting the distance finder apparatus to any desired position.

Figure 4:
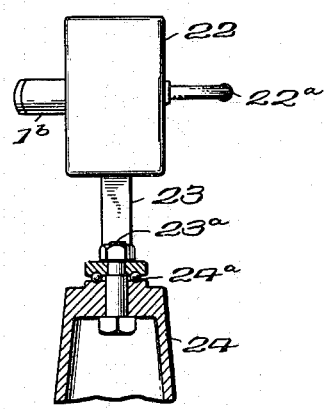
Figure 4 is a side elevation of Figure 3 showing part of the supporting stand in section.

One method of mounting the frame 23 upon the pedestal 24 is illustrated in Figure 4. As shown, a bolt 23a is secured to the frame 23 and is journaled in the upper end of the pedestal 24. A suitable ball bearing 24a may be provided between the frame 23 and the upper end of the pedestal 24. By the arrangement illustrated in Figures 3 and 4, the line of observation of the apparatus may be shifted to any desired position either horizontally or vertically.

Figures 5, 6:
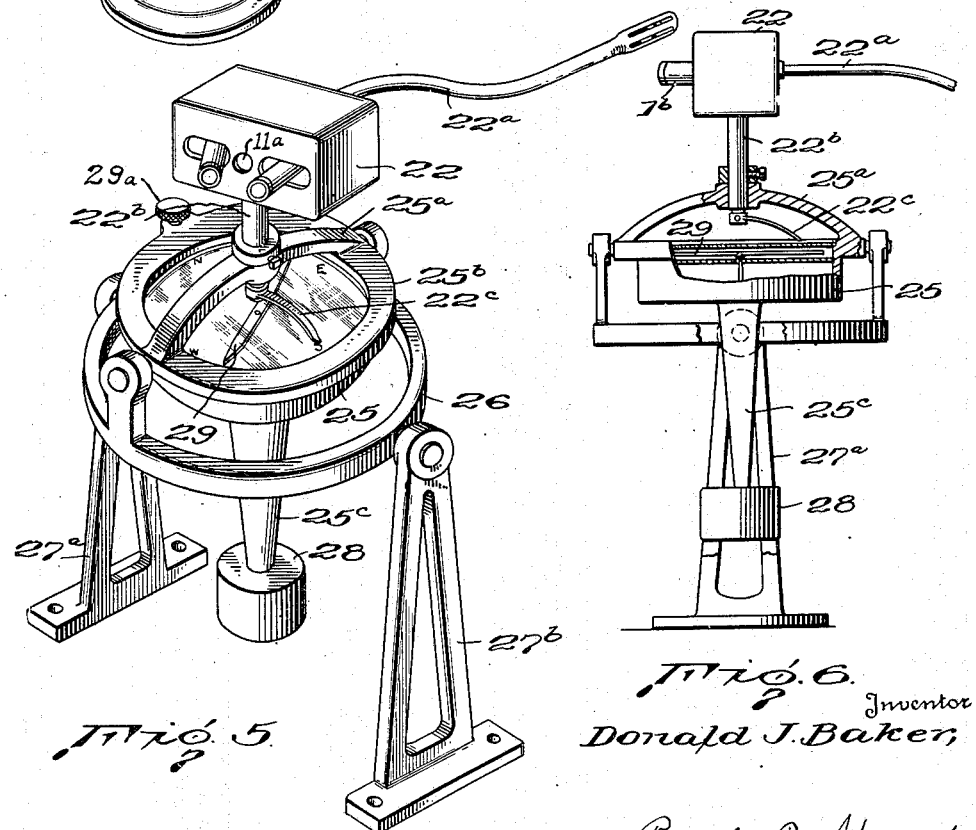
Figure 5 is a perspective view of an arrangement for mounting my distance finder for use on board ships.
Figure 6 is a side elevational view of Figure 5 with parts shown in section.

In Figure 5 I have shown an arrangement for mounting my distance finder apparatus for operation on board ships. In this arrangement the housing 22 containing the distance finding apparatus is supported at the upper end of a vertical shaft 22b journaled in a bridge member 25a of a ring 25b which forms a part of a housing 25 enclosing a magnetic compass. The ring 25b is pivotally supported upon a horizontal axis from ring 26, which in turn is pivotally supported on a horizontal axis at right angles to the horizontal axis of the ring 25 by a pair of standards 27a and 27b. The compass housing 25 is provided with an extension 25c extending below the housing and carrying a counter-weight 28 for counterbalancing the distance finder apparatus and for maintaining the same in a horizontal position regardless of the rolling or pitching of the ship. If desired, the counter-weight 28 may take the form of a gyroscope for stabilizing the distance finder apparatus and maintaining the same in a horizontal plane. The apparatus may be shifted in the horizontal plane by means of the handle 22a, and the lower end of the supporting shaft 22b is provided with an indicator 22c cooperating with the compass card mounted in the housing 25. By this means the direction of the line of observation of the distance finder apparatus may be observed at any instant, the needle of the compass being shown at 29. A knob 29a is provided for orienting the compass card.

The arrangement shown in Figure 5 is adapted for scanning the horizon only, but if it is desired to scan the sky as well, the housing 22 may be mounted for pivotal movement in vertical plane by providing a supporting frame on the upper end of shaft 22b like the frame 23 in Figure 3.

The physical arrangement of my invention may be modified in many ways without departing from the principle thereof. For example, any other form of reversible means may be employed for driving the gear 4 or for oscillating the light beam projectors, and other forms of control switches may be employed. Also, instead of using a tube 10 to close the circuit of switch 9, a magnet relay 30 may be used to momentarily close the switch operating circuit through contact 30a. Relay 30 is connected to the output circuit of amplifier 12 by switch 30b and the arrangement is such that contact 30a is closed only when the cell 11 is energized.

In the embodiment of my invention described above, the lens tube associated with the light sensitive element remains fixed with respect to the supporting frame and establishes the line of observation while the light beam projector is movable to determine the distance, but it is obvious that the line of observation may be established by a fixed light beam projector and the lens tube and cell made movable with respect to the beam projector for determining the distance.

While I have described one embodiment of my invention using beams of light, it will be understood that other forms of radiant energy may be employed. For example, the distance finder will operate with short-wave radio beam transmitters substituted for the light projectors 1 and 2 and a short-wave directive receiver substituted for the lens tube 11a and the photo-cell 11.

My distance finder may be used for detecting the presence of enemy ships during war, and, by using infra-red light projectors at 1 and 2, the apparatus may be operated without attracting the attention of the enemy. Also, infra-red light, as well as short-wave radio beams, will penetrate fog, snow and rain, and will permit the apparatus to be used in the day light as well as at night.

From the foregoing it will be seen that my invention is automatic in operation and provides a continuous distance indication of any object located in the line of observation, and the only manual operation required is the orientation of the apparatus to keep the line of observation on the object.

In Figure 7 I have diagrammatically shown another form of my invention in which the light beams from sources 1 and 2 remain at a fixed angular position with respect to the line of observation, and the cell 11 is arranged to control a pair of signal lights to indicate the presence of an object 13 at a given distance from the point of observation. Elements corresponding to similar elements in other figures are indicated by the same reference characters. In this arrangement the switch 9 is arranged to energize either a green lamp G or a red lamp R, depending upon the position of the switch arm 9a. The lamps R and G are preferably arranged upon an instrument board immediately in front of the operator, and the switch arm 9a is provided with an operating handle 9h which is also arranged within convenient reach of the operator, preferably extending through a slot formed in the instrument panel between the two signal lamps.

In the operation of Figure 7, the apparatus may be so mounted that the line of observation is in a fixed direction, and normally the switch lever 9a is in a position to energize the green lamp G. As soon as an object 13 appears in the line of observation at the point of intersection of two light beams, the cell 11 energizes the relay 30 and causes the switch 9 to interrupt the circuit to the lamp G and close the circuit to the red lamp R, thereby giving a warning signal to the operator. The switch 9 remains in the last operated position until the operator manually moves the switch to the green position by the handle 9h.

It will be understood that the "safety" distance, or the distance at which an object will be detected, may be varied by adjusting the angle between the beams and the line of observation.

The apparatus shown in Figure 7 may be used upon an airplane to indicate the presence of objects in the line of flight. For example, in Figure 8 I have shown an airplane T equipped with the apparatus in Figure 7 for projecting fixed beams FB in front of the plane in the line of flight, and this apparatus will serve to detect the presence of mountainous formations indicated at M when the plane approaches the mountain to a given fixed distance, and will display a warning signal to the pilot. The plane T will also be equipped with the automatic distance finder arrangement illustrated in Figure 1, and the oscillating beams of which are directed downwardly and indicated at OB in Figure 8, for the purpose of giving a continuous indication of the altitude of the plane above the ground.

In Figure 9 I have indicated another manner in which the apparatus in Figure 7 may be employed. In this arrangement the apparatus is pivotally mounted near the front of the bow of a boat BT, and suitable apparatus is provided for continuously oscillating the apparatus as a whole so the line of observation sweeps through an arc AC. The beams are set at such an angle that they intersect the line of observation at a desired "safety" distance DT from the point of observation, and the apparatus will thus serve as an automatic detector of objects coming within the "safety" distance DT.

I have herein described the principle of my invention and illustrated certain embodiments thereof. Various modifications will occur to those skilled in the art, and I desire it to be understood that all modificaitons which fall within the terms of the appended claims are to be considered as falling within the scope of my invention.

I claim:

1. In a distance finder, the combination of wave sensitive means at one point for receiving radiant waves along a given line of observation, means for projecting a concentrated beam of radiant waves from another point to intersect the line of observation at a third point, means for periodically shifting the angular relation of one of said means to shift the point of intersection, and means controlled by said wave sensitive means upon receipt of radiant waves reflected from an object in the line of observation for stopping the operation of said shifting means.

2. In a distance finder, the combination of light sensitive means at one point for receiving light along a given line of observation, means for projecting a concentrated beam of light from another point to intersect the line of observation at a third point, means for periodically shifting the angular relation of one of said means to shift the point of intersection, means controlled by said light sensitive means upon receipt of light rays reflected from an object in the line of observation for stopping the operation of said shifting means, and means associated with said shifting means for indicating the distance of said object.

3. In a distance finder, the combination of a light sensitive means for receiving light along a given line of observation, a light source spaced from said light sensitive means a given distance, means for projecting a concentrated beam of light from said source to intersect the line of observation, means for periodically shifting the angular position of said light projecting means to cause said beam to intersect the line of observation at various distances, and means controlled by said light sensitive means upon receipt of light rays reflected from an object in the line of observation for stopping the operation of said shifting means.

4. In a distance finder, the combination of a light sensitive means for receiving light along a given line of observation, a light source spaced from said light sensitive means a given distance, means for projecting a concentrated beam of light from said source to intersect the line of observation, means for periodically shifting the angular position of said light projecting means to cause said beam to intersect the line of observation at various distances, means controlled by said light sensitive means upon receipt of light rays reflected from an object in the line of observation for stopping the operation of said shifting means, a common support for all of said means, and means for mounting said support for universal movement to shift the line of observation to any desired position.

5. In a distance finder, the combination of wave sensitive means at one point for receiving radiant waves along a given line of observation, means for projecting a concentrated beam of radiant waves from another point to intersect the line of observation at a third point, means for periodically shifting the angular relation of one of said means to shift the point of intersection, and means controlled by said wave sensitive means upon receipt of radiant waves reflected from an object in the line of observation for reversing the direction of movement of said shifting means.

6. In a distance finder, the combination of a lens tube for establishing a line of observation, a source of light spaced a given distance from said lens tube, means for projecting a concentrated beam of light from said source to intersect said line of observation, reversible means for shifting the angular position of said light projecting means to cause said beam to intersect the line of observation at various distances, a light sensitive cell receiving light from said lens tube, and means controlled by said light sensitive cell upon receipt of light rays reflected from an object in the line of observation for reversing said shifting means.

7. In a distance finder, the combination of a lens tube for establishing a line of observation, a light projector spaced from said line of observation and arranged to project a concentrated beam of light intersecting said line of observation, said projector being mounted for angular rotation to cause said beam to intersect the line of observation at various distances, means for continuously oscillating said projector between two definite limits in angular position to cause said beam to continuously traverse said line of observation between two predetermined points, a light sensitive cell receiving light from said lens tube, and means controlled by said light sensitive cell upon receipt of light rays reflected from an object in the line of observation for controlling said oscillating means to limit the angular oscillation of said projector to an angle sufficient only for said beam to cross the line of observation at the point occupied by the object.

8. In a distance finder, the combination of a lens tube for establishing a line of observation, a light projector spaced from said line of observation and arranged to project a concentrated beam of light intersecting said line of observation, said projector being mounted for angular rotation to cause said beam to intersect the line of observation at various distances, a continuously operating motor, means driven by said motor for continuously oscillating said projector between two definite limits in angular position to cause said beam to continuously traverse said line of observation between two predetermined points, a reversible clutch connecting said oscillating means with said motor, a light sensitive cell receiving light from said lens tube, and means controlled by said light sensitive cell upon receipt of light rays reflected from an object in the line of observation for reversing said clutch.

9. In a distance finder, the combination of a lens tube for establishing a line of observation, a light projector spaced from said line of observation and arranged to project a concentrated beam of light intersecting said line of observation, said projector being mounted for angular rotation to cause said beam to intersect the line of observation at various distances, a continuously operating motor, means driven by said motor for continuously oscillating said projector between two definite limits in angular position to cause said beam to continuously traverse said line of observation between two predetermined points, a reversible clutch connecting said oscillating means with said motor, a pair of magnets for controlling said clutch, a two-position switch for energizing said magnets, a light sensitive cell receiving light from said lens tube, and means controlled by said light sensitive cell upon receipt of light rays reflected from an object in the line of observation for opening the circuit of one magnet and closing the circuit of the other.

10. In a distance finder, the combination of a lens tube for establishing a line of observation, a source of light spaced a given distance from said lens tube, means for projecting a concentrated beam of light from said source to intersect said line of observation, reversible means for shifting the angular position of said light projecting means to cause said beam to intersect the line of observation at various distances from said lens tube, a light sensitive cell receiving light from said lens tube, means controlled by said light sensitive cell upon receipt of light rays reflected from an object in the line of observation for reversing said shifting means, means associated with said shifting means for indicating the distance of the object, a common support for all of said means, and means for mounting said support for universal movement whereby the line of observation may be shifted to any desired direction.

11. In combination, a lens tube for establishing a line of observation, a source of light spaced a given distance from said lens tube, means for projecting a concentrated beam of light from said source to intersect the line of observation at a distance from said lens tube, a light-sensitive cell receiving light from said lens tube, an electric relay having two operated positions, and means responsive to the momentary energization of said light-sensitive cell by light passing through said lens tube from said line of observation for operating said relay from its last operated position to the opposite position, and means controlled by said relay in one position for shifting said beam to traverse said line of observation in one direction and in the other position to traverse the line of observation in the opposite direction.

12. In a distance finder, the combination of radiant wave means for establishing a line of observation, wave receiving means having a line of observation intersecting said first line of observation, means for continuously oscillating said wave receiving means between two definite limits in angular position, whereby the point of intersection of said lines of observation is periodically shifted between definite limits, a radiant wave sensitive element arranged to receive radiant waves from said receiving means, and means controlled by said sensitive element upon receipt of radiant waves through said receiving means for reversing said oscillating means.

DONALD J. BAKER.